United States Patent
Blount et al.

(10) Patent No.: US 9,990,261 B2
(45) Date of Patent: Jun. 5, 2018

(54) SYSTEM AND METHOD FOR RECOVERING A STORAGE ARRAY

(71) Applicant: NetApp, Inc., Sunnyvale, CA (US)

(72) Inventors: Joseph Blount, Wichita, KS (US); William P. Delaney, Wichita, KS (US); Charles Binford, Wichita, KS (US); Joseph Moore, Wichita, KS (US); Randolph Sterns, Boulder, CO (US)

(73) Assignee: NETAPP, INC., Sunnyvale, CA (US)

( * ) Notice: Subject to any disclaimer, the term of this patent is extended or adjusted under 35 U.S.C. 154(b) by 224 days.

(21) Appl. No.: 15/142,999

(22) Filed: Apr. 29, 2016

(65) Prior Publication Data
US 2017/0315888 A1    Nov. 2, 2017

(51) Int. Cl.
| G06F 11/16 | (2006.01) |
| G06F 11/20 | (2006.01) |
| G06F 3/06 | (2006.01) |
| H04L 29/08 | (2006.01) |
| G06F 11/10 | (2006.01) |

(52) U.S. Cl.
CPC .......... *G06F 11/2069* (2013.01); *G06F 3/065* (2013.01); *G06F 3/0619* (2013.01); *G06F 3/0689* (2013.01); *H04L 67/1097* (2013.01); *G06F 11/1092* (2013.01); *G06F 2201/805* (2013.01); *G06F 2211/104* (2013.01)

(58) Field of Classification Search
CPC ............. G06F 11/1076; G06F 11/1092; G06F 2211/104; G06F 2211/1047; H04L 67/1095; H04L 67/1097
See application file for complete search history.

(56) References Cited

U.S. PATENT DOCUMENTS

| 5,835,694 | A | * | 11/1998 | Hodges | G06F 11/1076 711/114 |
| 6,553,511 | B1 | * | 4/2003 | DeKoning | G06F 11/1076 707/999.1 |
| 7,698,501 | B1 | * | 4/2010 | Corbett | H04L 67/1095 711/114 |
| 9,405,623 | B2 | * | 8/2016 | Taranta, II | G06F 11/1076 |
| 9,836,355 | B2 | * | 12/2017 | Pundir | G06F 11/1438 |
| 9,842,028 | B1 | * | 12/2017 | Mullis, II | G06F 11/1469 |

(Continued)

OTHER PUBLICATIONS

U.S. Appl. No. 15/135,161, entitled: "Systems, Methods, and Computer Readable Media Providing Arbitrary Sizing of Data Extents," and drawings, filed Apr. 21, 2016 with the U.S. Patent Office, 34 pages.

*Primary Examiner* — Joseph O Schell
(74) *Attorney, Agent, or Firm* — Haynes and Boone, LLP

(57) ABSTRACT

Systems and techniques for recovering a storage array are disclosed. These systems and techniques include determining a size corresponding to a storage stripe of the storage array. Pieces assigned to the storage stripe are identified. A storage configuration corresponding to the pieces assigned to the storage stripe is detected. Ordinal information and parity information are determined corresponding to the pieces assigned to the storage stripe. The size determined corresponding to the storage stripe, identification of the pieces assigned to the storage stripe, the storage configuration, the ordinal information, and the parity information is stored in a data store to reconstruct lost or corrupted metadata corresponding to the storage array.

20 Claims, 5 Drawing Sheets

(56) References Cited

U.S. PATENT DOCUMENTS

| | | | |
|---|---|---|---|
| 2004/0024963 A1* | 2/2004 | Talagala | G06F 11/1076 711/114 |
| 2006/0271734 A1* | 11/2006 | Strange | G06F 3/0607 711/114 |
| 2010/0088541 A1* | 4/2010 | Tanaka | G06F 11/0781 714/6.12 |
| 2016/0320986 A1* | 11/2016 | Bonwick | G06F 3/0619 |

* cited by examiner

SYSTEM AND METHOD FOR RECOVERING A STORAGE ARRAY

CROSS-REFERENCE TO RELATED APPLICATIONS

This application incorporates by reference the entirety of the disclosure of commonly owned U.S. patent application Ser. No. 15/135,161, entitled "Systems, Methods, and Computer Readable Media Providing Arbitrary Sizing of Data Extents."

TECHNICAL FIELD

The present description relates to data storage and retrieval and, more specifically, to techniques and systems for recovering a storage array.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Larger implementations may incorporate Network Attached Storage (NAS) devices, Storage Area Network (SAN) devices, and other configurations of storage elements and controllers in order to provide data and manage its flow.

These storage implementations may include storage technologies such as Redundant Arrays of Independent Disks (RAID). RAID is a storage technology that is used in many conventional storage implementations. RAID may include different storage configurations, which are commonly referred to as RAID levels. RAID levels may be associated with different data redundancy and/or error correction techniques. For example, some conventional RAID levels and their associated data protection schemes include RAID 1 (mirroring), RAID 5 (striping with parity), and RAID 6 (striping with double parity). In some storage implementations, conventional RAID levels may use random or pseudo random placement of data, using techniques such as declustered RAID.

Storage technologies, such as the RAID storage technology described above, may organize data in a storage array using metadata. The metadata describes placement of the data in the storage array so that the data can be located and accessed. However, in some instances, the metadata may be lost or corrupted. Without the metadata to describe the placement of the data, the data in the storage array may appear random and without any logical ordering. Accordingly, the loss of the metadata causes the data stored in the storage array to be unusable for storage operations.

Conventional storage systems may not be able to recover the data in the storage array unless a backup of the metadata is available. If a backup is not available, the data in the storage array may be unrecoverable to these conventional storage systems. Thus, a need exists for systems and techniques to recover the metadata corresponding to a storage array.

BRIEF DESCRIPTION OF THE DRAWINGS

The present disclosure is best understood from the following detailed description when read with the accompanying figures.

DETAILED DESCRIPTION

Figure 1:
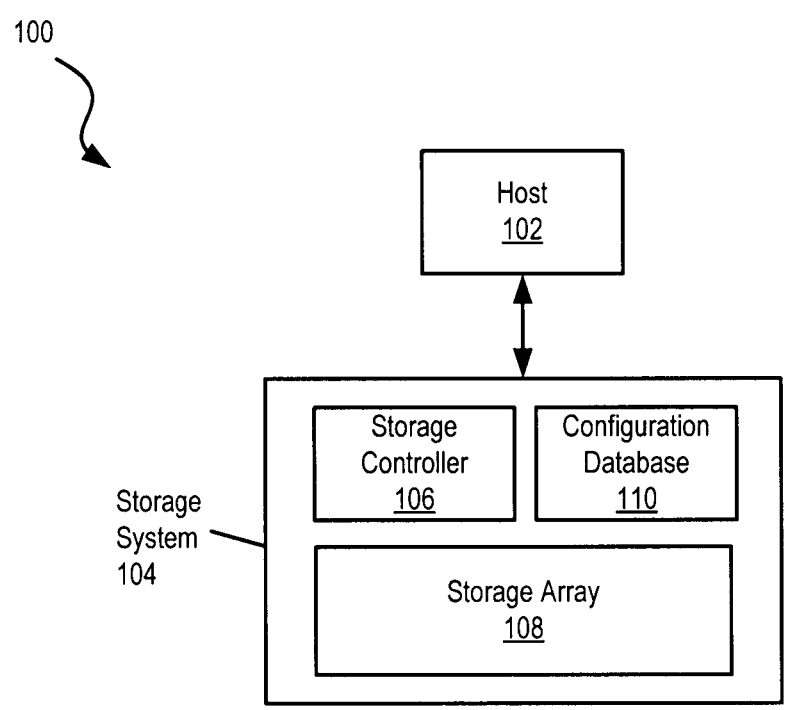
FIG. 1 is a schematic diagram of a storage architecture 100, according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments except where explicitly noted. Finally, in view of this disclosure, particular features described in relation to one aspect or embodiment may be applied to other disclosed aspects or embodiments of the disclosure, even though not specifically shown in the drawings or described in the text.

Various embodiments provide a system, method, and machine-readable medium for a storage system that performs recovery of a storage system that includes a storage array. The storage array includes a plurality of storage devices, which may include, but are not limited to hard disk drives (HDDs).

The storage system includes metadata describing the layout of the storage array so that the data stored in the storage array may be accessed. This metadata may be stored in a data store, which in some examples is referred to as a configuration database. While configuration database includes the term "database," any data store type may be used to store the metadata that describes the layout of the storage array.

The metadata stored in the configuration database organizes the data of the storage array into storage stripes. This metadata includes information such as the locations of the pieces of the storage stripes, the identity of the storage stripes to which the pieces are assigned, the sizes of the pieces, and the logical ordering corresponding to the pieces within the storage stripes.

The recovery techniques disclosed herein include analyzing contents of the storage array to infer characteristics of the storage array. These characteristics are used to populate the configuration database with the metadata that logically organizes the data of the configuration database. Analysis that may be performed to infer the characteristics includes determining sizes of a plurality of storage stripes, identifying pieces that are assigned to the storage stripes, detecting configuration information (such as RAID levels) corresponding to the storage stripes, determining ordinal information corresponding to the pieces of the storage stripes, and identifying parity information corresponding to the storage stripes. These techniques are beneficial and advantageous for recovering a configuration database, which allows data in a storage array to be accessed.

The embodiments disclosed herein may provide several advantages. First, a lost or corrupted configuration database may render a storage array unusable. The techniques described herein provide a recovery solution that is able to restore the configuration database and thus render the storage array usable for storing and retrieving data. Second, by providing recovery techniques, a configuration database may be restored without having to access a backup of the configuration database. This may result in data storage and data processing savings. Thus, while existing storage systems have been generally adequate for storing and retrieving data, the techniques described herein provide improved reliability, performance, and efficiency. The systems and methods described herein that allow for recovery of the configuration database provide a valuable improvement over conventional storage systems. Of course, it is understood that these features and advantages are shared among the various examples herein and that no one feature or advantage is required for any particular embodiment.

FIG. 1 is a schematic diagram of a storage architecture 100, according to aspects of the present disclosure. The storage architecture 100 includes a host 102 in communication with a storage system 104. It is understood that for clarity and ease of explanation, only a single host 102 and a single storage system 104 are illustrated, although any number of hosts 102 may be in communication with any number of storage systems 104.

Furthermore, while the storage system 104 and the host 102 are referred to as singular entities, a storage system 104 and/or host 102 may include any number of computing devices and may range from a single computing system to a system cluster of any size. Accordingly, each host 102 and storage system 104 includes at least one computing system, which in turn includes a processor such as a microcontroller or a central processing unit (CPU) operable to perform various computing instructions.

The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a communication interface such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

The host 102 includes any computing resource that is operable to exchange data with a storage system 104 by providing (initiating) data transactions to the storage system 104. To interact with (e.g., read, write, modify, etc.) remote data, the host 102 sends one or more data transactions to the respective storage system 104. Data transactions include requests to read, write, or otherwise access data stored by a data storage device associated with the storage system 104. Data transaction requests may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information.

In some examples, a host 102 includes one or more host bus adapters (HBAs) in communication with the storage system 104. In other examples, the HBA(s) of the host may be connected to one or more storage systems. The HBA(s) provide an interface for communicating with the storage system 104, and in that regard, may conform to any suitable hardware and/or software protocol. In various embodiments, a HBA may include, for example, Serial Attached SCSI (SAS), iSCSI, InfiniBand, Fibre Channel and/or Fibre Channel over Ethernet (FCoE) bus adapters.

Communications paths between the host 102 and the storage system 104 may take the form of a direct connection (e.g., a single wire or other point-to-point connection), a networked connection, or any combination thereof. Thus, in some embodiments, one or more communication paths traverse a network, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. In some embodiments, a host 102 has multiple communication paths with a single storage system 104 for redundancy. The multiple communication paths may be provided by a single HBA or multiple HBAs. In some embodiments, multiple communication paths operate in parallel to increase bandwidth.

Turning now to the storage system 104, the storage system 104 includes a storage controller 106, and in some examples may include additional storage controllers. The storage system 104 is structured with at least one storage array 108, which includes data that may be stored and/or retrieved for the host 102. The storage system 104 is structured with a configuration database 110, which logically organizes the layout of the storage array 108 so that the data in the storage array 108 may be accessed by the storage controller 106.

The storage controller 106 of the storage system 104 is structured to receive transaction requests from the host 102 and to send responses to the host 102. The storage controller 106 of the storage system 104 is also structured to communicate with the storage array 108. The storage controller 106 exercises low-level control over one or more storage devices of the storage array 108 to execute (perform) data transactions on behalf of the host 102. These transactions may include, for example, such as reading, writing, and/or modifying data of one or more storage devices of the storage array 108.

The storage array 108 of the storage system 104 contains a plurality of storage devices across which data is spread. The storage array 108 may implement declustered RAID techniques and/or other techniques to spread the data across the storage devices. The data may be spread evenly or unevenly across the storage devices. In some examples, the data may appear to be spread across the storage devices according to a pseudo-random or random layout. In various examples, the plurality of storage devices include hard disk drives (HDDs), solid state drives (SSDs), optical drives, and/or any other suitable volatile or non-volatile data storage medium. The storage array 108 may include a logical grouping for speed and/or redundancy that includes a virtualization technique such as RAID (Redundant Array of Independent/Inexpensive Disks).

At a high level, virtualization includes mapping physical addresses of the storage devices into a virtual address space and presenting the virtual address space to one or more hosts (e.g., host 102). In this way, the storage system 104 may represent a group of storage devices as a volume. Thus, a host 102 can access the volume without concern for how it is distributed among the underlying storage devices of the storage array 108. For example, the storage controller 106 may implement RAID techniques by storing data in the storage array 108 using a storage configuration such as RAID 1 (mirroring), RAID 5 (striping with parity), RAID 6 (striping with double parity), and/or other storage configuration. To provide this storage configuration, data in the storage array 108 is divided into storage stripes, which are further divided into pieces, RAID stripes, RAID pieces, and sectors. In the case of declustered RAID, a volume may be comprised of thousands or millions of storage stripe pieces, each of which may be randomly or pseudo-randomly placed on drives.

The configuration database 110 of the storage system 104 is structured to store metadata describing the layout of the storage array 108, such that the storage controller 106 is able to access the data stored on the storage array 108. In some examples, the configuration database 110 is stored on a separate storage from the storage array 108 or even with the storage controller 106, while in other examples the configuration database 110 is stored as a component of the storage array 108. The configuration database 110 may be implemented using any appropriate physical storage hardware, such as HDDs or SDDs. The layout metadata maintained by the configuration database 110 may include, but is not limited to, sizes corresponding to the storage stripes, identifications of the pieces corresponding to each storage stripe, the storage configuration (such as which RAID level is implemented), the logical ordering (ordinal information) corresponding to the pieces of the storage stripe, identifications of which (if any) pieces of the storage stripes contain parity information, and so forth.

The configuration database 110 is communicatively coupled to the storage controller 106, which may access the layout metadata and update the layout metadata to reflect any updates to the layout of the storage array 108.

The storage controller 106 may also access the configuration database 110 to recover and/or repair the configuration database 110 in the event of a failure leading to the loss or corruption of the configuration database 110. This recovery may be triggered based on a user input or based on a determination made by the host 102 or the storage system 104.

In some examples, the recovery of the configuration database 110 may be performed by other components in addition to, or instead of the storage controller 106. For example, the storage array 108 may be communicatively coupled to another computing device, which may be structured to perform the recovery.

Figure 3:
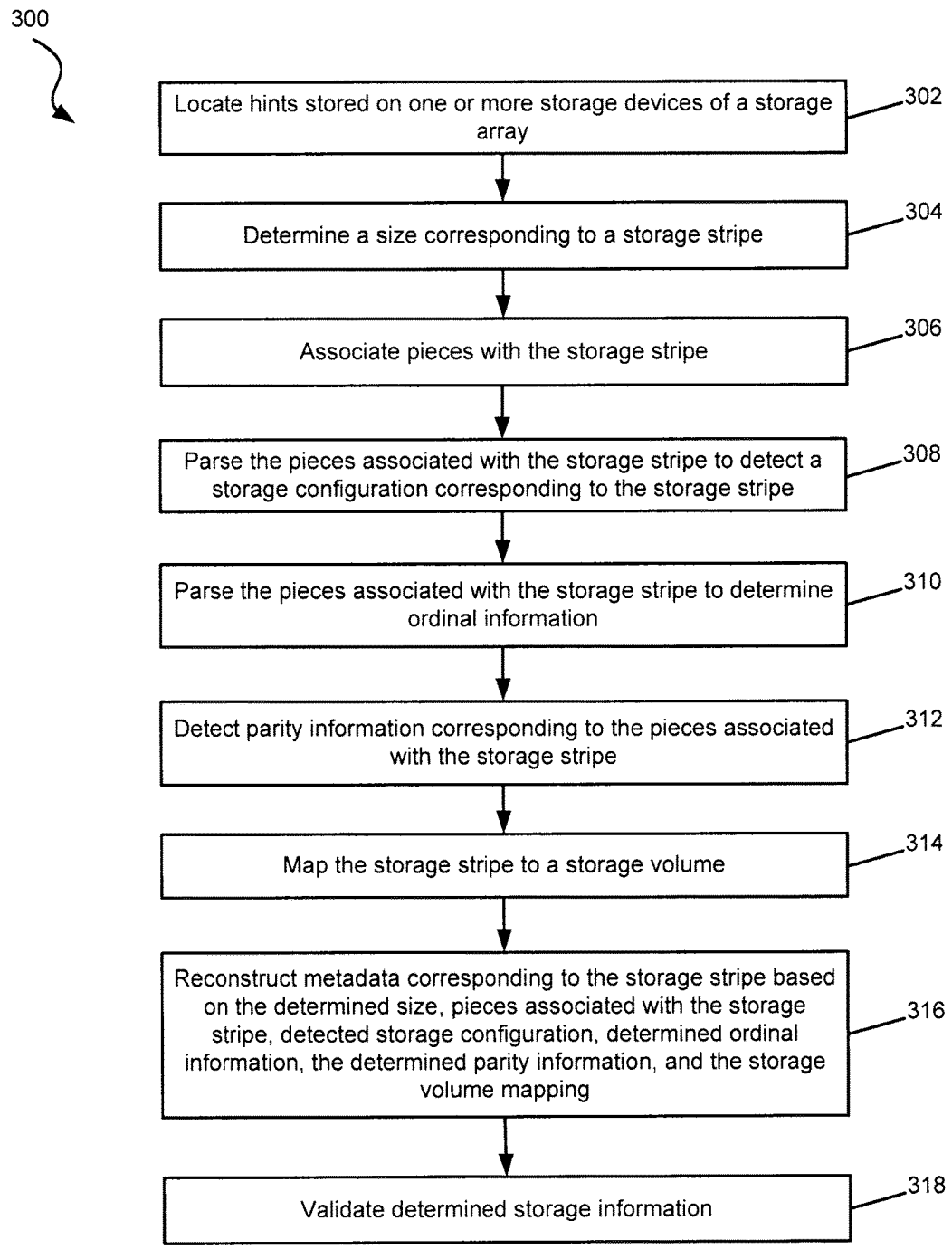
FIG. 3 is a flow diagram illustrating a method of recovering layout information corresponding to a storage array, according to some examples of the present disclosure.

An example of a process that may be performed to recover the configuration database 110 is described in more detail with respect to FIG. 3.

Figure 2A:
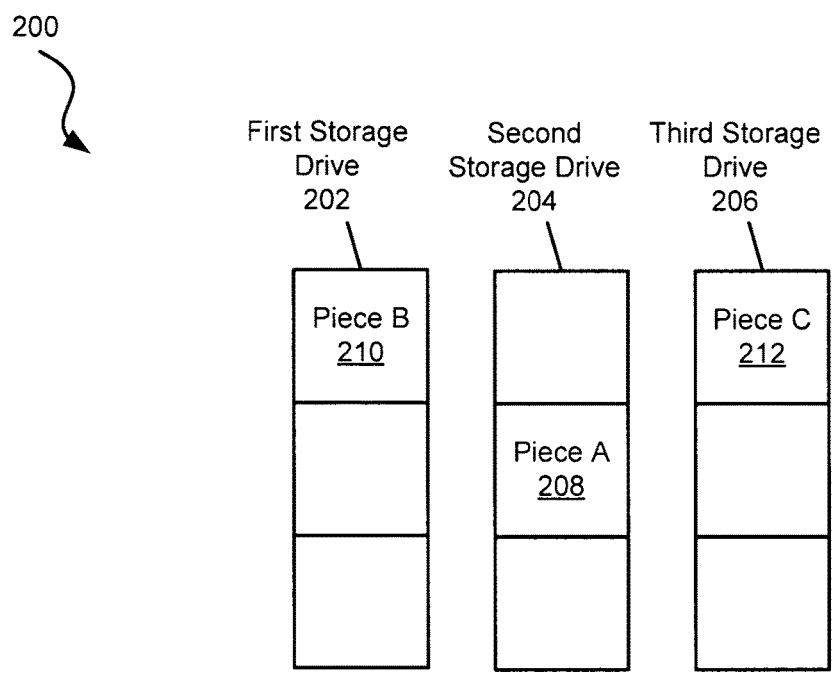
FIGS. 2A, 2B, 2C are schematic diagrams of storage stripe layouts, according to aspects of the present disclosure.
Figure 2B:
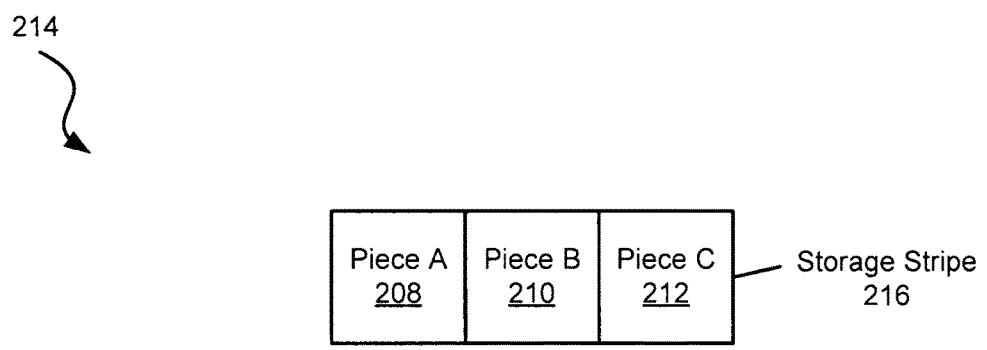
Figure 2C:
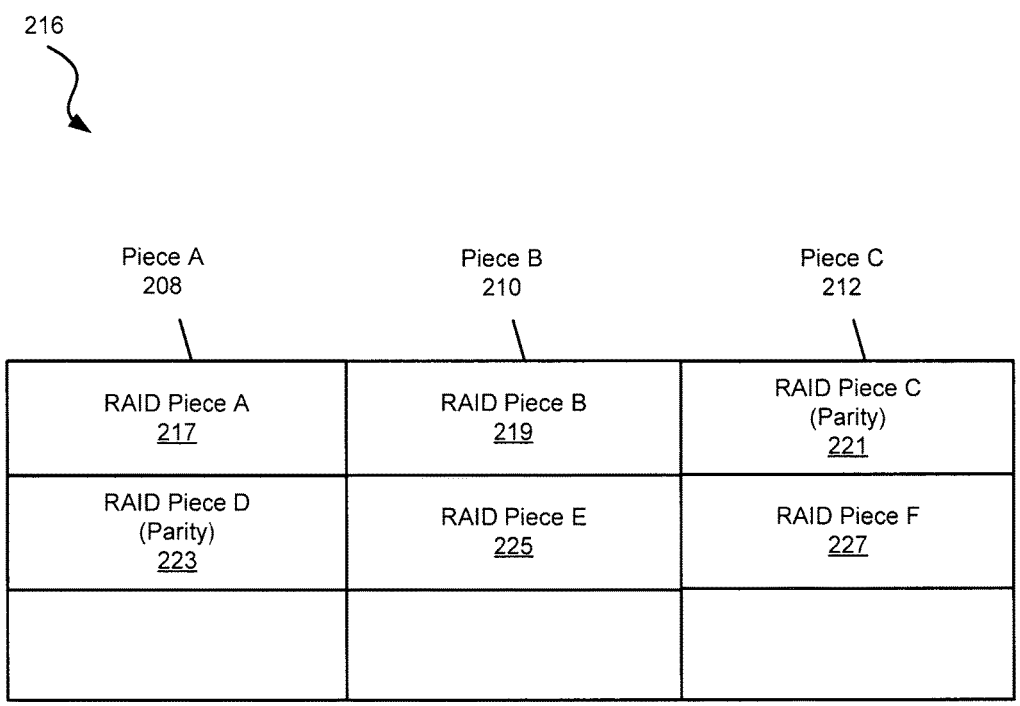
Figure 2D:
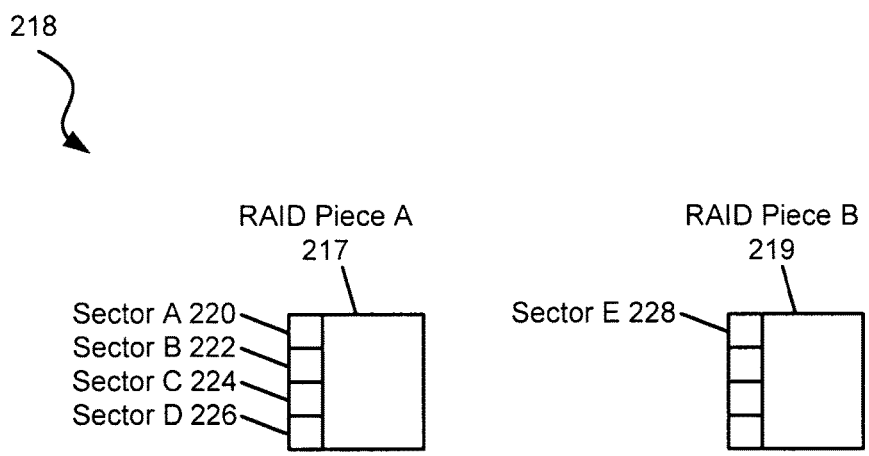
FIGS. 2D and 2E are schematic diagrams of RAID stripe layouts, according to aspects of the present disclosure.
Figure 2E:
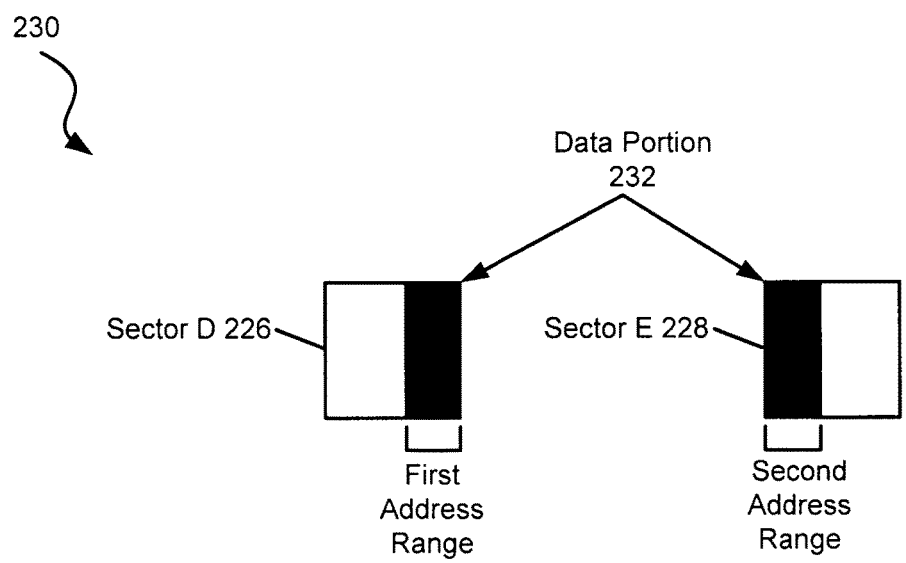

FIGS. 2A, 2B, 2C are schematic diagrams of storage stripe layouts, according to aspects of the present disclosure. FIGS. 2D and 2E are schematic diagrams of RAID stripe layouts, according to aspects of the present disclosure. These simplified stripe layouts are intended to illustrate examples that are helpful for understanding a recovery process, such as the recovery process that is provided with respect to FIG. 3.

In the present example, storage devices of a storage array (e.g., storage array 108) are structured to include block-level striping, such that data is split across two or more storage devices. In some examples, these storage devices include one or more storage devices that store parity information corresponding to the storage stripes. For example, storage devices may be structured to include a declustered RAID 5 storage configuration. The particular RAID 5 storage configuration may be structured to store a plurality of storage stripes across the storage devices. Each storage stripe may be structured to include any number of pieces (e.g., five), of which four of the pieces store user data received from a host (e.g., host 102) and the fifth piece stores parity information corresponding to the other four pieces.

While the pieces may have any suitable size, they are typically uniform across storage devices. For example, the pieces may have a uniform size of 512 MB across storage devices. Pieces are again divided into RAID pieces, which are further divided into sectors. Sectors are typically uniform blocks of the pieces that are allocated to store particular data. For example, a 512 MB sized piece may be further divided into 4,096 RAID pieces that each may be 128 KB in size, which may each be divided into thirty two sectors that are 4 KB in size. These sectors are distributed among the storage devices. Each piece (and each sector of a RAID piece) represents a portion of a storage stripe that is allocated to at least one storage device. Moving back to a higher level of abstraction, a given storage volume may include multiple storage stripes.

FIG. 2A is a schematic diagram of a storage stripe layout 200, according to aspects of the present disclosure.

Storage stripe layout 200 illustrates that pieces of a storage stripe may be distributed across more than one storage device and that the pieces may be stored at different offsets of each storage device. That is, one piece of a storage stripe may be located at an address of a storage device and another piece of the storage stripe may be located at a different address of another storage device.

In the present example, storage stripe layout 200 depicts three pieces (piece A 208, piece B 210, and piece C 212) of storage stripe that is stored in a storage array. The storage array includes a first storage device 202, a second storage device 204, and a third storage device 206. While the present example depicts each storage device as including one piece of the storage stripe, in other examples some storage devices may not include any pieces of a storage stripe. Furthermore, a volume may be comprised of many stripes, each of which may be comprised of a different set of storage devices.

In the present example, the first storage device 202 includes piece B 210, the second storage device 204 includes piece A 208, and the third storage device 206 includes piece C 212. As shown in storage stripe layout 200, each piece is stored at a different offset of a storage device. For example, piece B 210 and piece C 212 are shown as being stored beginning at a first offset of storage devices 202 and 206, respectively, and piece A 208 is stored in at a second offset of the second storage device 204. While the present example illustrates these pieces as being of uniform size, in other examples the pieces may be of non-uniform size.

FIG. 2B is a schematic diagram of a storage stripe layout 214, according to aspects of the present disclosure.

Storage stripe layout 214 provides a logical representation of the pieces of the storage stripe described in FIG. 2A. As shown the storage stripe 214 is composed of piece A 208, piece B 210, and piece C 212. While these pieces are distributed at a plurality of locations on a plurality of storage devices, these pieces are logically related to a same storage stripe and are positioned relative to one another according to a logical ordering. In the present example, piece A 208 is logically positioned prior to piece B 210 and that piece B 210 is logically positioned prior to piece C 212. The ordinal information that describes the logical ordering of the pieces may be stored in a configuration database.

FIG. 2C is another schematic diagram of the storage stripe layout 216 that provides further detail with respect to the storage stripe 214 illustrated in FIG. 2B, according to aspects of the present disclosure.

Storage stripe layout 216 provides a logical representation of RAID pieces of RAID stripes included in the storage stripe 216. As shown the storage stripe 216 is composed of piece A 208, piece B 210, and piece C 212. Each of these pieces includes a plurality of RAID pieces, which may be further organized into RAID stripes. In the present example, a first RAID stripe includes RAID piece A 217, RAID piece B 219, and RAID piece C 221. A second RAID stripe includes RAID piece D 223, RAID piece E 225, and RAID piece F 227. It is understood that other RAID stripes are present but are not illustrated for ease of explanation.

As shown, rotating parity may be provided by storing parity information for different RAID stripes on different pieces, which may each be stored on a different storage device. For example, the first RAID stripe includes its parity information on RAID piece C 221 that is stored on piece C 212, while the second RAID stripe includes its parity information on RAID piece D 223 that is stored on piece A 208. As previously discussed with respect to FIG. 2B, each piece may correspond to a different storage device, such that different RAID stripes may store their parity information on different storage devices.

The information describing the layout of the storage stripe 216 is stored in a data store, which in some examples is referred to as a configuration database (e.g. configuration database 110). This layout information identifies that piece A 208, piece B 210, and piece 212 are associated with storage stripe 216. The layout information also provides the ordinal information corresponding to the pieces and RAID pieces, as well as the sizes of the pieces and RAID pieces, and which (if any) RAID pieces are used to store parity information. For example, as discussed above, RAID piece D 223 and RAID piece C 221 include parity information that may be used for error correction purposes. Accordingly, the configuration database may also include a parity placement algorithm that identifies RAID pieces D 223 and RAID piece C 221 as RAID parity pieces.

FIG. 2D is a schematic diagram of a RAID stripe layout 218, according to aspects of the present disclosure.

RAID stripe layout 218 illustrates that the RAID pieces of a RAID stripe may further be divided into sectors.

In the present example, RAID piece A 217 includes sector A 220, sector B 222, sector C 224, and sector D 226. The sectors are organized logically, such that data may be stored across sectors. For example, a first data portion may be stored in sector C 224 and extend into sector D 226. Further, data portions may also be stored across RAID pieces. For example, the first data portion may be stored in sector C 224, sector D 226, and extend into sector E 228 of RAID piece B 219.

The logical ordering of the RAID pieces and the sectors within the RAID pieces may be used to determine ordering corresponding to the data portions. For example, if the configuration database identifies that RAID piece A 217 is logically located before RAID piece B 219 then a computing device may determine that the first data portion begins in sector C 224, has a middle portion in sector D 226 and ends in sector E 228.

FIG. 2E is a schematic diagram of a RAID stripe layout 230, according to aspects of the present disclosure.

RAID stripe layout 230 illustrates that data portions may extend across sectors of RAID pieces of a RAID stripe. Such a data portion may be created and managed by an indirection scheme such as a file system, and in some instances are not sector aligned or sector sized.

In the present indirection layer example, each sector includes a range of memory addresses which may be used to store data portions. Particular memory addresses within the range of memory addresses may be located at offsets from the start of the range of memory addresses. For example, sector D 226 may include a first address range that stores data portion 232. Sector D 226 may include a descriptor, which identifies that the data portion 232 starts at an offset, which is the beginning of the first address range, and that the data portion 232 has a particular size. Accordingly, if the size of the data portion 232 is greater than the size of the first address range, then it may be determined that the data portion 232 extends into a next sector by an amount that is equal to the difference between the size of the data portion 232 and the size of the first address range.

In the present example, the next sector that follows sector D 226 is sector E 228. Data portion 232 extends into a second address range of sector E 228. The end of the second address range may be referred to as the offset of sector E 228 at which the data portion 232 ends. Sector E 228 may also store another data portion, which may immediately follow the offset corresponding to the end of the second address range.

The information regarding locations of the data portions within each sector and size of the data portions may be stored in the sector descriptors. In some examples, a sector descriptor for a sector is stored at a particular address range of the sector, which may be at the start or the end of an address range assigned to the sector. This sector descriptor may also be used to store other information such as a number that is assigned when writing data to the sector. This number may include a write sequence number. This write sequence number may be consistent across the sectors of pieces that are assigned to a same storage stripe.

FIG. 3 is a flow diagram illustrating a method of recovering layout information corresponding to a storage array, according to some examples of the present disclosure. The method 300 may be performed by processing logic that includes hardware (e.g., circuitry, dedicated logic, programmable logic and microcode), software (such as instructions run on a computer system, specialized hardware, dedicated machine, or processing device), firmware, or a combination thereof. For instance, in some examples, the storage controller 106 of FIG. 1 performs the recovery method 300 by executing computer readable code and providing the functionality described herein. However, the scope of embodiments may include any appropriate computing device to perform the actions of method 300, such as a host computing device or storage server. The computing device, in response to the loss or corruption of the metadata in the configuration database 110, parses the user data saved to the array of physical storage drives and reconstructs some or all of the metadata in the configuration database 110 without the assistance of the configuration database 110. Additional steps can be provided before, during, and after the steps of method 300, and that some of the steps described can be replaced, eliminated and/or re-ordered for other embodiments of the method 300.

At action 302, a computing device determines whether there are hints stored on one or more of the storage devices of a storage array. In more detail regarding the hints, hints may be used to provide metadata that allow steps of the below method to be skipped with respect to one or more storage stripes. In some examples, available space is detected between a data portion and an end of a sector during the storing of data to the storage stripes. The computing device may use this available space to store a hint corresponding to one or more storage stripes. This hint may include metadata, such as identifications of the pieces corresponding to a storage stripe, ordinal information corresponding to the pieces, and parity information regarding the storage stripe. Accordingly, the computing device may scan the storage devices for such hints, thereby allowing retrieval of the information from the hints and allowing one or more of the below steps to be bypassed for one or more of the storage stripes. In the present example, the following steps are performed to obtain information for storage stripes for which hints are unable to be obtained.

At action 304, a computing device determines sizes corresponding to the storage stripes of the storage array. In some examples, the storage stripes are of uniform size, while in other examples the storage stripes are not of uniform size.

In the case of declustered RAID, a size corresponding to a storage stripe, such as a size of each piece of the storage stripe, may be determined by sequentially reading information from a plurality of sectors from one or more storage devices and parsing the information for write sequence numbers. In some examples, the computing device reads the write sequence numbers from the descriptors of the plurality of sectors of the one or more storage devices. In some examples, sectors of a piece of a storage stripe are stored as a continuous block, adjacent to one another. These sectors may share a same write sequence number. Accordingly, by identifying the size of the contiguous block of sectors, the size of a piece of a storage stripe may be determined. Each piece of a storage stripe may be configured to be of uniform size. Thus, by determining the size of a piece of the storage stripe, the size of each piece of the storage stripe may also be determined.

In the cases of traditional RAID or declustered RAID, an additional size exists corresponding to the transition of consecutive addresses between storage devices in the storage stripe. This size may be determined by identifying the byte packing of the sectors of the pieces. This byte packing information may be identified by reading sector descriptors to confirm whether the storage information corresponding to data portions stored by the sectors is consistent (as shown in FIG. 2E). If the sector descriptors are inconsistent with regard to the data portions stored in the sectors, this indicates an end of a particular RAID piece of the RAID stripe. That is, inconsistent sector descriptors indicate a transition between a RAID piece of a RAID stripe and a RAID piece of another RAID stripe.

In more detail regarding byte packing, each sector descriptor may identify a start address corresponding to each data portion stored in the sector and a size of the data portion. Thus, if a first data portion has a size that extends past the address space available on a first sector, it can be determined that the data portion therefore extends into a second sector. The amount that the data portion extends into the second sector can be determined by the difference between the size of the data portion and the size of the address space allocated for the data portion on the first sector. Accordingly, an offset to which the data portion extends into the second sector may be determined. The second sector will be found to have consistent sector descriptor information if it identifies that its data portions begin immediately after the offset. In other words, if the data portion is identified as extending to offset X of the second sector, the second sector should identify that another data portion begins at offset X+1. The second sector will have inconsistent sector descriptor information if it identifies that its first data portion begins at any offset other than X+1.

The computing device determines byte packing information using this matching of sector descriptor information. The byte packing information may be used to identify the range of sectors having consistent sector descriptor information to indicate the sectors that are therefore allocated to a particular RAID piece of a RAID stripe. As mentioned previously, if the sector descriptors are inconsistent with regard to the data portions stored in the sectors, this indicates an end of a particular RAID piece of the RAID stripe. Alternatively, the descriptors may contain configuration hints such as a ref-tag representing a portion of the LBA. A discrepancy in the hints (e.g. nonconsecutive ref-tags) indicates the end of a particular RAID piece of the RAID stripe. The size of the range of sectors may be used to determine the size corresponding to a RAID piece of the RAID stripe (or all RAID pieces of the RAID stripe if the stripe uses uniform RAID piece size).

At action 306, the computing device associates pieces with storage stripes. In the present example, the computing device associates pieces with data stripes by creating a plurality of data structures, such as multiple data arrays stored in memory. Each storage device is assigned a particular data array of the multiple data arrays. A data structure assigned to a particular storage device may include an entry for each piece that is stored on the storage device. Because the size of the storage stripe pieces were determined in action 302 and the size of the storage devices is known, the computing device may determine a number of entries on each storage device using the size of the storage stripe pieces and the sizes of the storage devices. Accordingly, the data structure may be configured to include a maximum size corresponding to the determined number of entries.

Each entry in the data structure may be populated by reading a first logical block address (LBA) corresponding to each piece that is stored on the storage device. The computing device reads a write sequence number from the descriptor of the sector that is located at the LBA. The computing device populates the write sequence number into the data structure at the entry corresponding to piece of the storage stripe. The computing device may populate the write sequence number corresponding to each piece on each storage device into the data structures in a similar manner.

Once the data structures for the storage devices are populated, the pieces corresponding to a storage stripe may be identified as the pieces that are associated with a same write sequence number. For example, a first data structure may identify a first piece as associated with a first sequence number. A second data structure may identify a second piece as associated with the first sequence number. A matching of the write sequence numbers may be performed to identify that the first piece and the second piece are part of a same storage stripe. This matching may similarly be performed for each piece of each storage stripe to identify the pieces that correspond to each storage stripe.

In some examples, sectors that store parity information may not be organized consistently with sectors that store non-parity information. For example, sectors that store parity information may not include recognizable write sequence numbers or recognizable information corresponding to stored data portions. Accordingly, if a descriptor of a sector is read that does not appear to be consistent with a non-parity sector, the sector may be identified as a parity sector. In these instances, the computing device may skip ahead to another sector and again attempt to read a sector descriptor. The amount that the computing device skips ahead may correspond to a size determined corresponding to the RAID stripe (such as the size determined using the byte packing technique).

At action 308, the computing device parses data from the pieces associated with the storage stripe to detect a storage configuration corresponding to the storage stripe. The storage configuration may correspond to a particular RAID level. For example, the computing device may determine that the storage stripe is configured using a RAID 5 storage configuration. The storage configuration may be determined by reading descriptors of the sectors of the pieces and analyzing hints contained in the descriptors (if room for the hints was available).

Pieces of a storage stripe that have identical sector descriptors may be an indication that a mirroring storage configuration is implemented. The detection of mirroring may indicate that a RAID 1 or RAID 10 storage configuration is used (both of which implement mirroring). In another example, detection of a lack of sectors that store parity information may indicate that a non-parity storage configuration (such as RAID 1 or RAID 10) is implemented.

Accordingly, the computing device reads and analyzes information from the sectors to detect that storage stripes implement particular storage configurations, such as RAID levels. These storage configurations may be uniform or non-uniform across the storage stripes.

At action 310, the computing device parses data from the pieces associated with the storage stripe to determine ordinal information corresponding to the pieces that are identified as assigned to the storage stripe. This ordinal information may include, for example, the relative logical locations of the pieces in the storage stripe. For example, a first piece of the storage stripe may be identified as positioned prior to a second piece of the storage stripe.

The computing device may determine the ordinal information corresponding to the pieces associated with the storage stripe using the byte packing information from the sector descriptors. For example, the last sector of a first piece may have a descriptor that identifies a data portion that extends 123 bytes into a next sector. The computing device identifies a second piece that is positioned immediately after the first piece by reading sector descriptors from the other pieces of the storage stripe to identify a sector descriptor that indicates a 123 byte portion is used to store a data portion from a preceding sector. Accordingly, by matching the byte packing information of the sectors of the pieces of the storage stripe, the pieces may be logically arranged within the storage stripe.

The computing device may also determine the ordinal information corresponding to the pieces of the storage stripe in other ways. For example, if the storage configuration is identified as including parity, and if the parity rotates among the storage devices, the identification of which storage device stores the parity for the storage stripe may indicate the ordering of the other pieces of the storage stripe.

Alternatively, ordinal information may be discovered using configuration hints from the descriptor (such as a ref-tag representing a portion of the LBA).

At action 312, the computing device detects parity information corresponding to the pieces of the storage stripe. Once the ordinals of the non-parity pieces of the storage stripe are identified in action 310, the computing device generates the expected parity for these non-parity pieces of the storage stripe. The computing device compares the expected parity with the parity data stored in pieces of the storage stripes that are identified a parity pieces. The matching between the expected parity and the stored parity may be performed using a hash table, binary search, or other sorting algorithm. Thus, the parity pieces corresponding to each storage stripe may be identified by matching the expected parity with the parity stored in particular pieces that have not yet been matched to a particular storage stripe. In some examples, when generating parity and comparing to the available parity pieces, the computing device may generate a partial parity that is sufficient to uniquely identify the piece, without generating the entire parity corresponding to the piece.

In other examples, this step may be skipped if the storage configuration is detected to not use parity pieces.

At action 314, the computing device maps each storage stripe to a storage volume. In some examples, the logical block address (LBA) corresponding to each piece is read from a field of a footer portion at the end of each piece. Accordingly, using the LBA obtained from the footer, each piece may be mapped to a LBA within a volume.

In another example, LBAs stored in the footers of each piece correspond to data portions within a piece. Accordingly, by identifying the LBAs of the data portions of each piece, each piece is mapped to a location within a volume.

At action 316, the computing device reconstructs metadata corresponding to the storage stripe by storing the storage stripe information determined in the previous steps to a data store. In the present example, the data store is configured as a configuration database, which may be employed by a storage controller to access data on the storage devices of the storage array. In the present example, the storage stripe information that is stored for each storage stripe includes the determined size information, identification of pieces associated with the storage stripe, detected storage configuration, determined ordinal information for the pieces, the determined parity information, and the storage volume mapping. In other examples, the storage stripe information is stored to the data store on an as-determined basis at each step of the process. In yet other examples, some various portions of the storage stripe information are stored at various times during the process.

In some examples, the reconstruction of the metadata is performed in response to loss or corruption of the metadata. For example, a user may provide an input to trigger the performance of steps 302, 304, 306, 308, 310, 312, 314, and/or 316 by one or more computing devices based on a human or computerized determination that the metadata has been lost or corrupted.

At action 318, the computing device validates the determined storage information to determine the correctness of the determined storage stripe information. In some examples, the computing device scans storage stripe information from the data store and validates parity information corresponding to one or more of the storage stripe(s). In some examples, the computing device performs a full scan of the storage array to read data from all storage stripes. In other examples, the computing device performs a partial scan of the storage array to read data from a partial amount of the storage stripes. The computing device may validate parity information for the scanned storage stripes by reading data from the storage stripes, generating parity information from the data, and comparing the generated parity information with the parity information stored in the identified parity blocks of the storage stripe. Accordingly, the computing device is able to determine whether the storage stripe information stored in the configuration database is accurate and, responsive to the determination, indicate whether the configuration database is ready for data access.

As will be recognized, the method 300 provides storage system recovery techniques that address a technical challenge particular to data storage technology. In some embodiments, this improved storage system recovery technique allows for recovery of storage array metadata that would otherwise be unrecoverable. The present techniques address challenges provided by conventional storage system recovery techniques and provide significant improvements to these techniques.

In various embodiments, the storage system recovery techniques are performed using various combinations of dedicated, fixed-function computing elements and programmable computing elements executing software instructions. Accordingly, it is understood that any of the steps of method 300 may be implemented by a computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and Random Access Memory (RAM).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   determining a size corresponding to a storage stripe by parsing data from an array of physical storage devices that store the storage stripe;
   associating pieces with the storage stripe;
   parsing the pieces associated with the storage stripe to detect a storage configuration corresponding to the storage stripe and determine ordinal information corresponding to the pieces; and
   in response to loss or corruption of metadata describing the storage stripe, reconstructing the metadata based on the determined size corresponding to the storage stripe, the pieces associated with the storage stripe, the detected storage configuration, and the determined ordinal information.

2. The method of claim 1, wherein determining the size corresponding to the storage stripe includes determining a size of a storage stripe piece, the determining of the size of the storage stripe piece comprising:
   identifying a contiguous portion of sectors that are associated with a same write sequence number; and
   determining a size of the contiguous portion of sectors.

3. The method of claim 1, wherein determining the size corresponding to the storage stripe comprises determining a size of a RAID piece, the determining of the size of the RAID piece comprising:
   reading a descriptor of a first sector to identify a data portion that is stored in the first sector that extends to a first offset of another sector; and
   reading descriptors corresponding to other sectors to locate a second sector that includes a second portion that begins at a second offset, wherein the second offset is located at an address that immediately follows the first offset.

4. The method of claim 1, wherein associating the pieces with the storage stripe comprises:
   creating a data structure that is associated with a storage device included in the array of physical storage devices;
   populating the data structure with a write sequence number that is read from a piece of the storage stripe;
   performing a matching corresponding to the write sequence number to identify other pieces that include the write sequence number; and
   associating each piece that includes the write sequence number with the storage stripe.

5. The method of claim 1, wherein detecting the storage configuration comprises:
   reading a plurality of descriptors of sectors corresponding to the pieces associated with the storage stripe to detect indications corresponding to mirroring and parity.

6. The method of claim 1, wherein determining the ordinal information comprises:
   reading a descriptor of a first sector to identify a data portion that is stored in the first sector that extends to a first offset of a second sector,
      wherein the first sector is a last sector of a first piece that is associated with the storage stripe, and
      wherein the second sector is a first sector of a second piece that is associated with the storage stripe; and
   reading a descriptor of the second sector to identify that the second sector includes second portion that begins at a second offset, wherein the second offset is located at an address that immediately follows the first offset.

7. The method of claim 1, further comprising:
   generating an expected parity corresponding to the pieces associated with the storage stripe; and
   matching the expected parity with parity information stored in one or more other pieces that have not been assigned to any storage stripe.

8. The method of claim 1, further comprising:
   mapping the storage stripe to a volume, the mapping including reading logical block address (LBA) information from a footer of a piece that is associated with the storage stripe.

9. The method of claim 1, further comprising validating the pieces associated with the storage stripe, the validating including:
   generating a parity corresponding to the pieces associated with the storage stripe; and
   comparing the generated parity with parity information stored in at least one parity piece associated with the storage stripe.

10. A non-transitory machine readable medium having stored thereon instructions for performing a method comprising machine executable code which when executed by at least one machine, causes the machine to:
   determine a size corresponding to a storage stripe by parsing data from an array of physical storage devices that store the storage stripe;
   associate pieces with the storage stripe;
   parse the pieces associated with the storage stripe to detect a storage configuration corresponding to the storage stripe and determine ordinal information corresponding to the pieces; and
   in response to loss or corruption of metadata describing the storage stripe, reconstruct the metadata based on the determined size corresponding to the storage stripe, the pieces associated with the storage stripe, the detected storage configuration, and the determined ordinal information.

11. The non-transitory machine readable medium of claim 10, wherein determining the size corresponding to the storage stripe includes determining a size of a storage stripe piece, the determining of the size of the storage stripe piece comprising:

identifying a contiguous portion of sectors that are associated with a same write sequence number; and
determining a size of the contiguous portion of sectors.

12. The non-transitory machine readable medium of claim 10, wherein determining the size corresponding to the storage stripe comprises determining a size of a RAID piece, the determining of the size of the RAID piece comprising:
reading a descriptor of a first sector to identify a data portion that is stored in a first sector that extends to a first offset of another sector; and
reading descriptors corresponding to other sectors to locate a second sector that includes a second portion that begins at a second offset, wherein the second offset is located at an address that immediately follows the first offset.

13. The non-transitory machine readable medium of claim 10, wherein associating the pieces with the storage stripe comprises:
creating a data structure that is associated with a storage device included in the array of physical storage devices;
populating the data structure with a write sequence number that is read from a piece of the storage stripe;
performing a matching corresponding to the write sequence number to identify other pieces that include the write sequence number; and
associating each piece that includes the write sequence number with the storage stripe.

14. The non-transitory machine readable medium of claim 10, further comprising:
determining a size of a RAID piece by reading a plurality of descriptors of sectors to identify a descriptor that stores a nonconsecutive value, wherein the nonconsecutive value indicates an end of the RAID piece; and
determining ordinal information corresponding to the RAID piece by identifying descriptors of the RAID piece and one or more other RAID pieces that store consecutive values.

15. The non-transitory machine readable medium of claim 10, wherein determining the ordinal information comprises:
reading a descriptor of a first sector to identify a data portion that is stored in the first sector that extends to a first offset of a second sector,
wherein the first sector is a last sector of a first piece that is associated with the storage stripe, and
wherein the second sector is a first sector of a second piece that is associated with the storage stripe; and
reading a descriptor of the second sector to identify that the second sector includes second portion that begins at a second offset, wherein the second offset is located at an address that immediately follows the first offset.

16. A computing device comprising:
a memory containing machine readable medium comprising machine executable code having stored thereon instructions for performing a method of recovering a storage array;
a processor coupled to the memory, the processor configured to execute the machine executable code to cause the processor to:

determine a size corresponding to a storage stripe by parsing data from an array of physical storage devices that store the storage stripe;
associate pieces with the storage stripe;
parse the pieces associated with the storage stripe to detect a storage configuration corresponding to the storage stripe and determine ordinal information corresponding to the pieces; and
in response to loss or corruption of metadata describing the storage stripe, reconstruct the metadata based on the determined size corresponding to the storage stripe, the pieces associated with the storage stripe, the detected storage configuration, and the determined ordinal information.

17. The computing device of 16, wherein determining the size corresponding to the storage stripe includes determining a size of a storage stripe piece, the determining of the size of the storage stripe piece comprising:
identifying a contiguous portion of sectors that are associated with a same write sequence number; and
determining a size of the contiguous portion of sectors.

18. The computing device of claim 16, wherein determining the size corresponding to the storage stripe comprises determining a size of a RAID piece, the determining of the size of the RAID piece comprising:
reading a descriptor of a first sector to identify a data portion that is stored in a first sector that extends to a first offset of another sector; and
reading descriptors corresponding to other sectors to locate a second sector that includes a second portion that begins at a second offset, wherein the second offset is located at an address that immediately follows the first offset.

19. The computing device of claim 16, wherein associating the pieces with the storage stripe comprises:
creating a data structure that is associated with a storage device included in the array of physical storage devices;
populating the data structure with a write sequence number that is read from a piece of the storage stripe;
performing a matching corresponding to the write sequence number to identify other pieces that include the write sequence number; and
associating each piece that includes the write sequence number with the storage stripe.

20. The computing device of claim 16, wherein determining the ordinal information comprises:
reading a descriptor of a first sector to identify a data portion that is stored in the first sector that extends to a first offset of a second sector,
wherein the first sector is a last sector of a first piece that is associated with the storage stripe, and
wherein the second sector is a first sector of a second piece that is associated with the storage stripe; and
reading a descriptor of the second sector to identify that the second sector includes second portion that begins at a second offset, wherein the second offset is located at an address that immediately follows the first offset.

* * * * *